US012168310B2

(12) United States Patent
Howard et al.

(10) Patent No.: US 12,168,310 B2
(45) Date of Patent: Dec. 17, 2024

(54) OBJECTS AND TOOLS FOR USE IN HYDRAULIC FRACTURING AND METHODS OF MANUFACTURING SAME

(71) Applicant: Victory Elements, LLC, Ashland, OH (US)

(72) Inventors: Robert Howard, Blacklick, OH (US); Ajit Yeshwant Sane, Medina, OH (US)

(73) Assignee: Victory Elements, LLC, Ashland, OH (US)

( * ) Notice: Subject to any disclaimer, the term of this patent is extended or adjusted under 35 U.S.C. 154(b) by 0 days.

(21) Appl. No.: 18/154,158

(22) Filed: Jan. 13, 2023

(65) Prior Publication Data

US 2023/0141611 A1 May 11, 2023

Related U.S. Application Data

(63) Continuation of application No. 16/914,061, filed on Jun. 26, 2020, now Pat. No. 11,577,426.

(60) Provisional application No. 62/866,913, filed on Jun. 26, 2019.

(51) Int. Cl.

| | |
|---|---|
| ***B29C 64/00*** | (2017.01) |
| ***B28B 1/14*** | (2006.01) |
| ***B28B 11/04*** | (2006.01) |
| ***E21B 33/12*** | (2006.01) |

(52) U.S. Cl.

CPC ................ *B28B 1/14* (2013.01); *B28B 11/04* (2013.01); *E21B 33/12* (2013.01); *E21B 2200/08* (2020.05)

(58) Field of Classification Search

CPC ................................. B28B 1/14; B28B 11/04

See application file for complete search history.

(56) References Cited

U.S. PATENT DOCUMENTS

| | | | | |
|---|---|---|---|---|
| 2010/0200235 | A1* | 8/2010 | Luo | E21B 33/138 507/265 |
| 2018/0306027 | A1* | 10/2018 | Sherman | G01N 33/24 |
| 2020/0332171 | A1* | 10/2020 | Hecht | E21B 33/129 |

* cited by examiner

*Primary Examiner* — Nicholas R Krasnow

(74) *Attorney, Agent, or Firm* — Benesch Friedlander Coplan & Aronoff LLP

(57) ABSTRACT

Embodiments disclosed herein include dissolvable and intentionally degradable objects that are useful for hydraulic fracking operations. Such objects are at least in part manufactured using materials that are soluble in certain fluids including water. The dissolvable and intentionally degradable fracking objects can be manufactured from one or more materials, including composite materials. In one embodiment, dissolvable fracking objects are manufactured from ceramic materials that are soluble in fluids such as water. Such dissolvable fracking objects include fracking balls and plugs. These fracking balls and plugs are arranged to seal a well for a predetermined period of time and dissolve over that predetermined period of time until the well is no longer sealed. In another embodiment, tools generally useful in fracking operations are manufactured to have desirable elastomeric properties. Such tools can be manufactured from a combination of materials that are soluble in fluids and generally dispersible in fluids.

16 Claims, 7 Drawing Sheets

OBJECTS AND TOOLS FOR USE IN HYDRAULIC FRACTURING AND METHODS OF MANUFACTURING SAME

CROSS-REFERENCE TO RELATED APPLICATION

This application is a continuation application and claims priority to U.S. patent application Ser. No. 16/914,061, filed on Jun. 26, 2020, and titled "OBJECTS AND TOOLS FOR USE IN HYDRAULIC FRACTURING AND METHODS OF MANUFACTURING SAME," that claims priority to Provisional Patent Application No. 62/866,913, filed on Jun. 26, 2019, and titled "Dissolvable Objects and Methods of Fabricating The Same," the disclosure of each of these applications is incorporated herein by reference in its entirety.

FIELD OF INVENTION

The present disclosure generally relates to dissolvable and intentionally degradable objects for a host of applications including but not limited to industry and consumer products anywhere dissolvable objects, parts and tooling are beneficial and the manufacture and use of such dissolvable and degradable objects. More specifically, the present disclosure relates to dissolvable hydraulic fracking plugs and balls useful in hydraulic fracking operations and other related applications and intentionally degradable tools for use in the oil and gas industry, particularly with hydraulic fracking operations.

BACKGROUND

Hydraulic fracturing ("fracking") is an established technique in the oil and gas industry useful in increasing the flow of natural gas, petroleum, and other hydrocarbons from subsurface reservoirs into wellbores drilled from the surface to access such reservoirs. Such techniques are commonly referred to as "well stimulation" techniques. Essentially, fracking involves using pressurized fluids to fracture rock formations to free hydrocarbon deposits held within such rock formations. Hydraulic fracturing often involves an isolated detonation to perforate the well casing and surrounding geological strata in a targeted zone within the wellbore followed by high-pressure injection of hydraulic fracking fluid ("fracking fluid") into the perforated area to create or expand fissures in the rock formations through which natural gas and petroleum are released. Fracking can be performed in multiple stages along the length of a wellbore. In order to accomplish such multiple fracking stage operations, hydraulic fracking plug and balls (i.e., "fracking balls" or "fracking plugs") are used to isolate targeted zones in vertical, deviated, and/or horizontal wells to facilitate well stimulation operations. A fracking plug is a tool that is inserted into a well to provide physical structure to the well shaft. The fracking plug includes an internal passage, to provide for fluid flow through the fracking plug, and a fracking ball seat to engage with a fracking ball to seal the well shaft. Once the fracking plug is inserted into the well shaft, the fracking ball is lowered into the shaft until it engages the seat and seals the shaft.

In one example, a well stimulation operation using a fracking ball and perforation techniques generally begins by using a drilling rig to drill a wellbore and set a cemented or uncemented steel casing into a drilled wellbore. The drilling rig is removed, and a wireline truck is used to detonate an explosive charge to perforate rock formations adjacent to the bottom of the well. Fracking fluid is pumped into the perforations to create or expand fissures in the rock strata. The wireline truck then sets a fracking plug, with a seat, and a solid fracking ball in the well to temporarily seal off the fractured section so that the next section of the wellbore can undergo the same process, i.e., perforation and stimulation. The placement of a fracking ball resting on a fracking plug seat creates an impingement in the well that prevents fluid conduction through the fracking tooling passageway. The process is repeated along the horizontal length of the wellbore. Once the well stimulation processes are completed along the length of the wellbore, the fracking balls must be physically removed or structurally deconstructed to allow collection of the released natural gas and/or petroleum. Such processes are generally completed by known methods such as drilling or milling each fracking ball from its fixed plug seat or backpressure suction or backpressure release after fracturing hold pressure is complete with a surface level mechanic ball catcher used to ensnare the released fracking ball.

The requirement for physically removing or structurally deconstructing the fracking ball adds an expensive and problematic step to the fracking process. The novel dissolvable fracking objects disclosed herein eliminate this step and contribute to a less expensive and more consistent fracking process.

Looking beyond standard prior art fracking balls and plugs, generally, prior art tools for use in the oil and gas industry are designed to be degradable. Such tools can serve a number of functions to facilitate temporary isolation of specific sections of a wellbore for well stimulation operations including controlled detonation and high-pressure injection of fracking fluids to fracture surrounding geological strata. The prior art degradable tools can be removed without intervention such as retrieval or drilling using surface-based well completion equipment, but such prior art tools have substantial limitations. The prior art degradable tools are generally fabricated from degradable aluminum, zinc, and magnesium alloys and water degradable polymers such as PVA, PLA and PGA polymer type materials. However, these degradable materials do not generally have the physical properties of an elastomeric rubber and thus, cannot be used to form elastomeric seals that are needed to temporarily seal wellbores and other systems against fluid flow. Thus, these prior art degradable tools have limited efficacy.

Elastomeric sealing compounds that dissolve and degrade at rates similar to those of degradable structure alloys (such as Tervalloy™) are stable for a period of time during well stimulation operations at low temperatures and degrade at high shut-in or flow back temperatures to reduce or eliminate any residual debris. Biodegradable polymers and films have been developed from a water dispersible polymer. For example, U.S. Pat. No. 6,296,914 describes a water sensitive film that includes polyethylene oxide, ethylene oxide, propylene-oxide copolymers, poly methyl acrylic acid, poly vinyl alcohol, poly vinyl methyl ether, polyvinyl pyrrolidone, vinyl acetate, copolymers, methyl cellulose, ethyl cellulose, hydroxypropyl cellulose, and hydroxy cellulose. Such polymers are generally not thermoplastic and are not moldable. Thus, they cannot be readily processed using conventional molding equipment. Further, these elastomers are not overly elastic and are limited in use and scope when considered for sealing applications.

In response to these and other problems with prior art elastomeric sealing compounds, attempts have been made to form water-shrinkable materials from elastomeric and water dispersible polymers. One such elastomer is described in U.S. Pat. No. 5,641,562 whereby an elastomer contains polyethylene oxide with a molecular weight of 200,000 and an ethylene vinyl acetate copolymer. While such elastomers are shrinkable, they do not dissolve or disintegrate in water so as to facilitate removal by backflush of fracking fluids. Furthermore, the elastomers are not sufficiently elastic.

An elastomeric biodegradable film described in U.S. Pat. No. 8,338,508 is a water-sensitive film containing an olefinic elastomer that is both elastic and water-sensitive (e.g. water-soluble, water dispersible, etc.) in that it loses its integrity over time in the presence of water. To achieve these dual attributes, the film contains an olefinic elastomer and a water-soluble polymer. While these polymers are normally chemically incompatible due to their different polarities, this patent discloses that phase separation can be minimized by selectively controlling certain aspects of the elastomer such as the nature of the polyolefins, water solubility, and other elastomer components, the relative amount of elastomer components, etc. For example, certain water-soluble polymers possessing low molecular weight and viscosity can be selected to enhance melt characteristics comparable to non-polar polyolefins. While this permits dissolvable characteristics, these systems cannot impart the essential structural strength and sealing properties required for various applications.

Therefore, in view of the current state of elastomeric materials for use in fracking operations, there is a need for a material with elastomeric characteristics that dissolves and degrades at rates similar to those of degradable structure alloys (such as Tervalloy™), which are stable for a period of operation under lower temperature during pumping operations, and which degrade at high shut-in or flow back temperature to reduce or eliminate any residual debris of the elastomeric materials in the wellbore. Disclosed herein are two phase composite materials to address these needs. The two phase composite includes an elastomeric phase with materials that are dispersible in fluids, such as water, and a soluble phase with materials that are dissolvable in fluids, such as water. Additionally, these composite materials utilize structures that are permeable and allow fluids, such as water, to pass through to control the dispersion and dissolving of materials in fluids.

SUMMARY

Embodiments disclosed herein include dissolvable and intentionally degradable objects that are useful for hydraulic fracking operations. Such objects are at least in part manufactured using materials that are soluble in certain fluids including water. The dissolvable and intentionally degradable fracking objects can be manufactured from one or more materials including composite materials. In one embodiment, dissolvable fracking objects are manufactured from ceramic materials that are soluble in fluids such as water. Such dissolvable fracking objects include fracking balls and plugs. These fracking balls and plugs are arranged to seal a well for a predetermined period of time and dissolve over that predetermined period of time until the well is no longer sealed. In another embodiment, tools generally useful in fracking operations are manufactured to have desirable elastomeric properties. Such tools can be manufactured from a combination of materials that are soluble in fluids, such as water, and generally dispersible in fluids such as water. Such tools can include elastomers and other such rubbers and ceramics.

DETAILED DESCRIPTION

Figure 1:
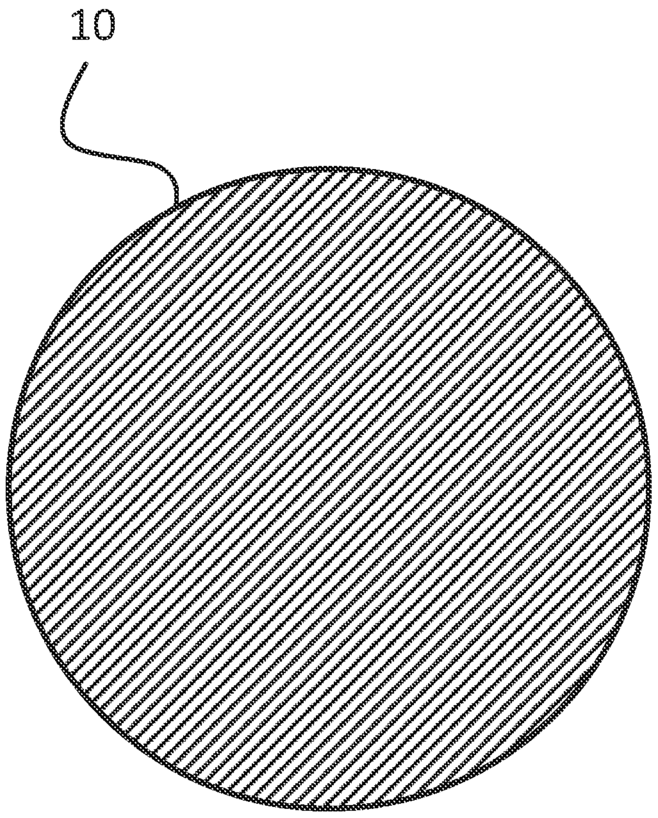
FIG. 1 schematically illustrates, in cross-section, a solid hydraulic fracking ball.

The present disclosure is not limited in terms of the particular embodiments described in this application, which are intended as illustrations of various aspects only. Many modifications and variations can be made without departing from the scope of the invention, as will be apparent to those skilled in the art. Functionally equivalent methods within the scope of the disclosure, in addition to those enumerated herein, will be apparent to those skilled in the art from the following descriptions. Such modifications and variations are intended to fall within the scope of the appended claims. The terminology used herein is for the purpose of describing particular embodiments only, and is not intended to be limiting.

Generally, the embodiments described herein are related to dissolvable objects and intentionally degradable objects and methods of manufacturing and using such objects. In particular, in one embodiment, the present disclosure relates to dissolvable fracking balls and fracking plugs for use in fracking applications. As set forth above, the steps of removing prior art fracking balls and/or fracking plugs result in extra cost, time delay of the production, and other problems for fracking processes. For example, it can require extra time and expense for drilling/milling, removing, recycling and/or properly disposing of prior art fracking balls and plugs. Accordingly, using dissolvable fracking balls and plugs described herein avoids the time consuming and expensive process of fracking ball and plug drilling/milling or retrieval and inherent difficulties in clearing the downhole well annulus prior to production.

Dissolvable fracking balls and plugs are arranged to dissolve in a predetermined period of time, upon exposure to fluids such as water, fracking fluid, brine, and/or other liquids that can be present in a wellbore. The dissolvable fracking balls and plugs are arranged to maintain their structural integrity until the dissolvable fracking ball or plug is positioned in the appropriate zone of the well, until another well tool has been actuated, until fracking operations are complete, and/or until conditions are favorable for the fracking ball or plug to dissolve. The embodiments herein are arranged such that dissolution time is predictable, which assures stage isolation during stimulation operations.

The dissolvable fracking balls and plugs can be manufactured from various materials such as, for example, a ceramic or a combination of different ceramic materials. In another example, the dissolvable fracking balls and plugs can be manufactured from an elastomeric matrix composite. The elastomeric matrix composite can be a combination of dissolvable ceramic fibers mixed and dispersed in an elastomeric compound.

The dissolvable fracking balls and plugs disclosed herein are arranged to have mechanical properties suitable to sustain the conditions in the wellbore (e.g., high pressure and/or high temperature). After being positioned in the wellborn, the dissolvable fracking balls and plugs are configured to dissolve after a predetermined period of time upon exposure to water, brine, fracking fluids, or a combination thereof, to selectively free the isolation zones for production (i.e., natural gas, petroleum, brine, etc. flowing from the wellbore).

Figure 2:
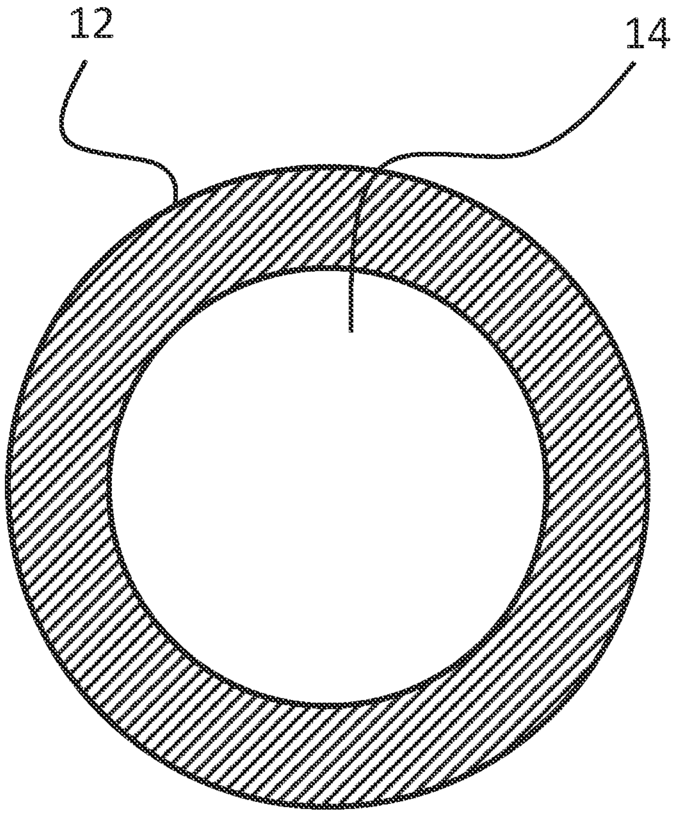
FIG. 2 schematically illustrates, in cross-section, a hollow hydraulic fracking ball.
Figure 3:
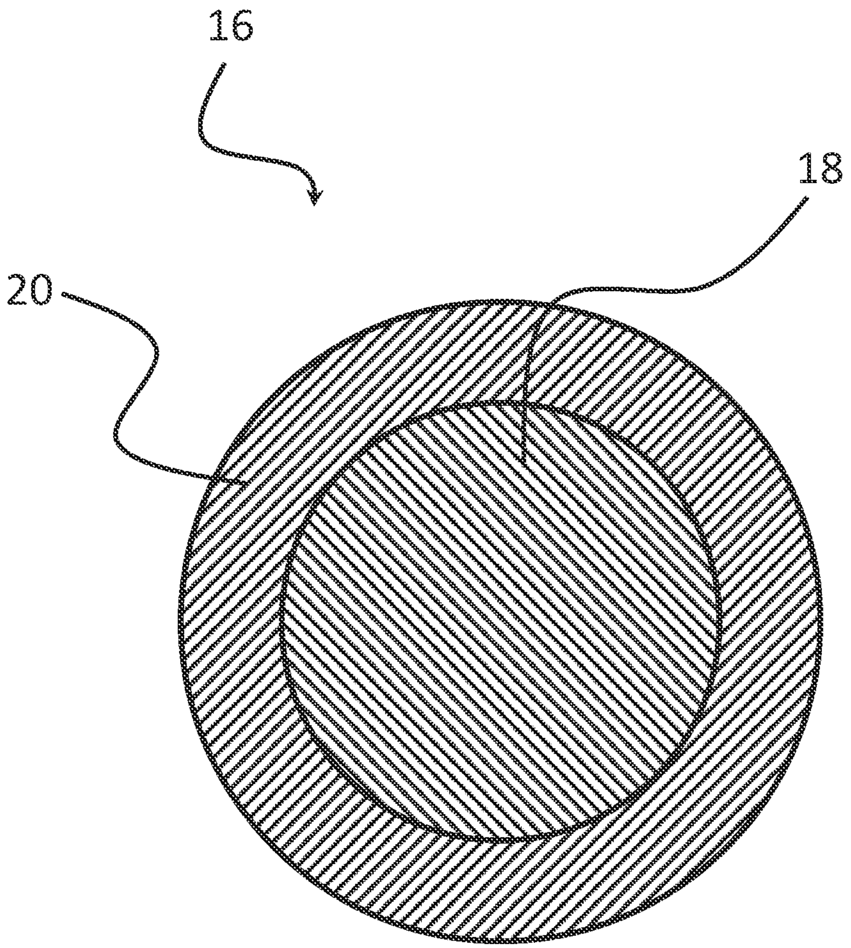
FIG. 3 schematically illustrates, in cross-section, a coated hydraulic fracking ball.

FIGS. 1-3 schematically illustrate examples of dissolvable fracking balls. The dissolvable fracking balls can be manufactured to be any suitable sizes and/or shapes (e.g., round, cylindrical, irregular shape). The dissolvable fracking balls are arranged to create an impingement to seal a well and provide adequate zone isolation during fracking operations.

In one example, illustrated in cross-section in FIG. 1, a dissolvable fracking ball 10 is a round solid component manufactured from one soluble ceramic material. It will be understood that such a solid component can also be manufactured in additional shapes such as a cylinder or irregular shape to meet specific needs. In another example, illustrated in cross-section in FIG. 2, a dissolvable fracking ball 12 is a round component manufactured from one soluble material which is arranged to have a hollow core 14. It will be understood that such a component can also be manufactured in additional shapes such as a cylinder or irregular shape to meet specific needs. In another example, illustrated in cross-section in FIG. 3, a dissolvable fracking ball 16 can be a round component manufactured from two different materials and includes a solid core 18 and an outer coating 20. While the outer coating 20 is illustrated as uniform in thickness, the outer coating can be applied such that the outer coating is not uniform in thickness and/or only partially covers the core 18. In various embodiments, the thickness of the outer coating 20 can be approximately 0.5 micrometer (μm) to approximately 10 μm, approximately 0.5 μm to approximately 8 μm, approximately 0.5 μm to approximately 6 μm, approximately 1 μm to approximately 4 μm, or approximately 1 μm to approximately 2 μm. The outer coating 20 can be applied to the core 18 by any suitable method. It will be understood that such a composite component can also be manufactured in additional shapes such as a cylinder or irregular shape to meet specific needs.

The dissolvable fracking balls 10, 12, 16 can be positioned in a wellbore using the same or similar methods as used for positioning prior art fracking balls. In certain embodiments, dissolvable fracking balls 10, 12, 16 can be positioned in a wellbore such that the dissolvable fracking balls 10, 12, 16 are positioned in a seat configured to secure the dissolvable fracking ball 10, 12, 16 in the well.

The hollow dissolvable fracking ball 12 can be arranged to be a delivery mechanism for providing chemicals (e.g., chemicals useful in fracking or other well operations) to the wellbore. In one example, well chemicals can be positioned in the hollow core 14 prior to the hollow dissolvable fracking ball 12 being positioned in the well. In such an arrangement, as the hollow dissolvable fracking ball 12 dissolves, the well chemicals are released from the hollow core 14 and are deposited into the wellbore to benefit the fracking operations.

The solid dissolvable fracking ball 10 and the hollow dissolvable fracking ball 12 can be manufactured from materials that are of the same or different chemical compositions. In one embodiment, the core 18 of the coated dissolvable fracking ball 16 can be manufactured from a material that is of the same chemical composition as the solid dissolvable fracking ball 10, and the outer coating 20 can be manufactured from a material that is of a different chemical composition than the core 18. In certain embodiments, the outer coating 20 and the core 18 can have different chemical compositions arranged such that the presence of the outer coating 20 affects the dissolving rate of the coated dissolvable fracking ball 16, thus offering additional controllability of the predetermined time that the dissolvable fracking ball 16 seals the well. The presence of the outer coating 20 can lengthen or shorten the dissolving time of the coated dissolvable fracking ball 16. In certain embodiments, materials used for the dissolvable fracking balls 10, 12, 16, including the outer coating 20, are water soluble such that the dissolvable fracking balls 10, 12, 16 dissolve when in contact with water.

As previously noted, materials can be arranged to have different dissolving rates to meet various applications. In certain embodiments of the coated dissolvable fracking ball 16, the outer coating 20 can be non-dissolvable in water or other fluids and can be applied such that it covers only a portion of the core 18. In such an arrangement, the uncovered portion of the core 18 dissolves upon exposure to water or other fluids, which can be useful in meeting certain applications. In certain embodiments, the coating layer 20 can be non-dissolvable and can completely or substantially cover the core 18, such that the core 18 is completely or substantially shielded from exposure to water, well fluids, brine, slick water, or a combination thereof (e.g., the coated dissolvable fracking ball 16 is not soluble). It will be understood that the dissolving rate of the coated fracking ball 16 can be finetuned by changing the extent to which the outer coating 20 covers the core 18.

The dissolvable fracking balls 10, 12, 16 can be arranged to have a controlled dissolving rate. In certain embodiments, the dissolvable fracking balls 10, 12, 16 are arranged to completely or substantially dissolve within approximately 24 hours (e.g., approximately 1 hour to approximately 24 hours) upon exposure to water, well fluids, brine, slick water, or a combination thereof. In certain embodiments, the dissolvable fracking balls 10, 12, 16 are arranged to completely or substantially dissolve in approximately two gallons of water, brine, fracking fluids, or a combination thereof. In certain embodiments, the dissolvable fracking balls 10, 12, 16 are arranged to completely or substantially dissolve in approximately 24 hours at a temperature of approximately 50° C. or higher upon exposure to water, brine, fracking fluids, or a combination thereof. In certain embodiments, the dissolvable fracking balls 10, 12, 16 are arranged to dissolve in water and become loose or displaceable from the fracking plug seat in approximately 4 hours to approximately 6 hours. In one example, the dissolvable fracking balls 10, 12, 16 can begin to dissolve in approximately 4 hours upon exposure to water, brine, fracking fluids, or a combination thereof. For example, the dissolvable fracking ball 10, 12, 16 is arranged to dissolve in water to the extent that the dissolvable fracking ball 10, 12, 16 comes loose and is freed from the fracking plug seat in approximately 6 hours upon exposure to water, brine, fracking fluids, or a combination thereof. The dissolvable fracking balls 10, 12, 16 can be arranged to dissolve relatively faster at higher temperatures and relatively slower at lower temperatures.

In certain embodiments, the dissolvable fracking balls 10, 12, 16 are arranged to sustain a high pressure and/or have a high strength or durability. For example, the solid dissolvable fracking ball 12 can have different mechanical properties than the hollow dissolvable fracking ball 14. In certain embodiments, the dissolvable fracking balls 10, 12, 16 are arranged to sustain (e.g., without substantial deformation) pressure range from approximately 1 psi to approximately 10,000 psi (approximately 7000 Pascal to approximately 70 megapascal, MPa). In certain embodiments, the dissolvable fracking balls 10, 12, 16 are arranged to sustain pressure from approximately 8,000 psi to approximately 12,000 psi. In certain embodiments, the dissolvable fracking balls 10, 12, 16 are arranged to sustain the undulating surge of the hydraulic fracking pumps. In certain embodiments, the dissolvable fracking balls 10, 12, 16 are arranged to sustain approximately 38,000 psi of compression on axis when subjected to a compression test. In certain embodiments, the dissolvable fracking balls 10, 12, 16 are arranged to sustain fluid pressure of approximately 18,000 psi (on seat fluid pressure). In certain embodiments, the dissolvable fracking balls 10, 12, 16 are arranged to sustain a drop test such that the dissolvable fracking balls 10, 12, 16 are substantially free of damage when the dissolvable fracking balls 10, 12, 16 are dropped from approximately 20 feet. In certain embodiments, the dissolvable fracking balls 10, 12, 16 contact an engineered fracking ball seat at speeds in excess of 30 mph without shattering, breaking apart, or deforming and maintain a seal of the well while on the seat such that fluids do not penetrate the seal of the well.

The dissolvable fracking balls 10, 12, 16 can be manufactured from a water dissolvable ceramic matrix, such as an amorphous dehydrated alkali salt compound that is melted at temperatures in excess of 1,000° C. in a special sacrificial graphite crucible to form a molten ceramic that has single wall carbon nanotube's (SWNT) imparted into the molten ceramic from the sacrificial graphite crucible. The SWNT in the molten ceramic allows for increased strength parameters and performance in elongation, tensile modules, and impact strength. In another embodiment, the dissolvable fracking balls 10, 12, 16 can be manufactured from a dehydrated anhydrous alkyd oxide ceramic. In yet another embodiment, the fracking balls 10, 12, 16 can be manufactured from dehydrated borate, phosphates, and silicates.

In certain embodiments, the dissolvable fracking balls 10, 12, 16 can be manufactured of a mixture that includes borates and/or dehydrated borate or boron (e.g., refined borates), silicates, phosphates, additives (e.g., processing additives which increase strength of the engineered shape), fillers, nanotubes (e.g., nickel nanotubes, carbon nanotubes), or a combination thereof. In certain embodiments, the mixture can include more than approximately 50 weight percent (wt. %) of silicate and borates and/or dehydrated borate or boron, less than approximately 40 wt. % of additives, and up to approximately 18 wt. % of nanotubes and/or fillers. The outer coating 20 of the coated disposable fracking ball 16 can be made of a mixture of modified two-part cross-linked epoxy.

Figure 4:
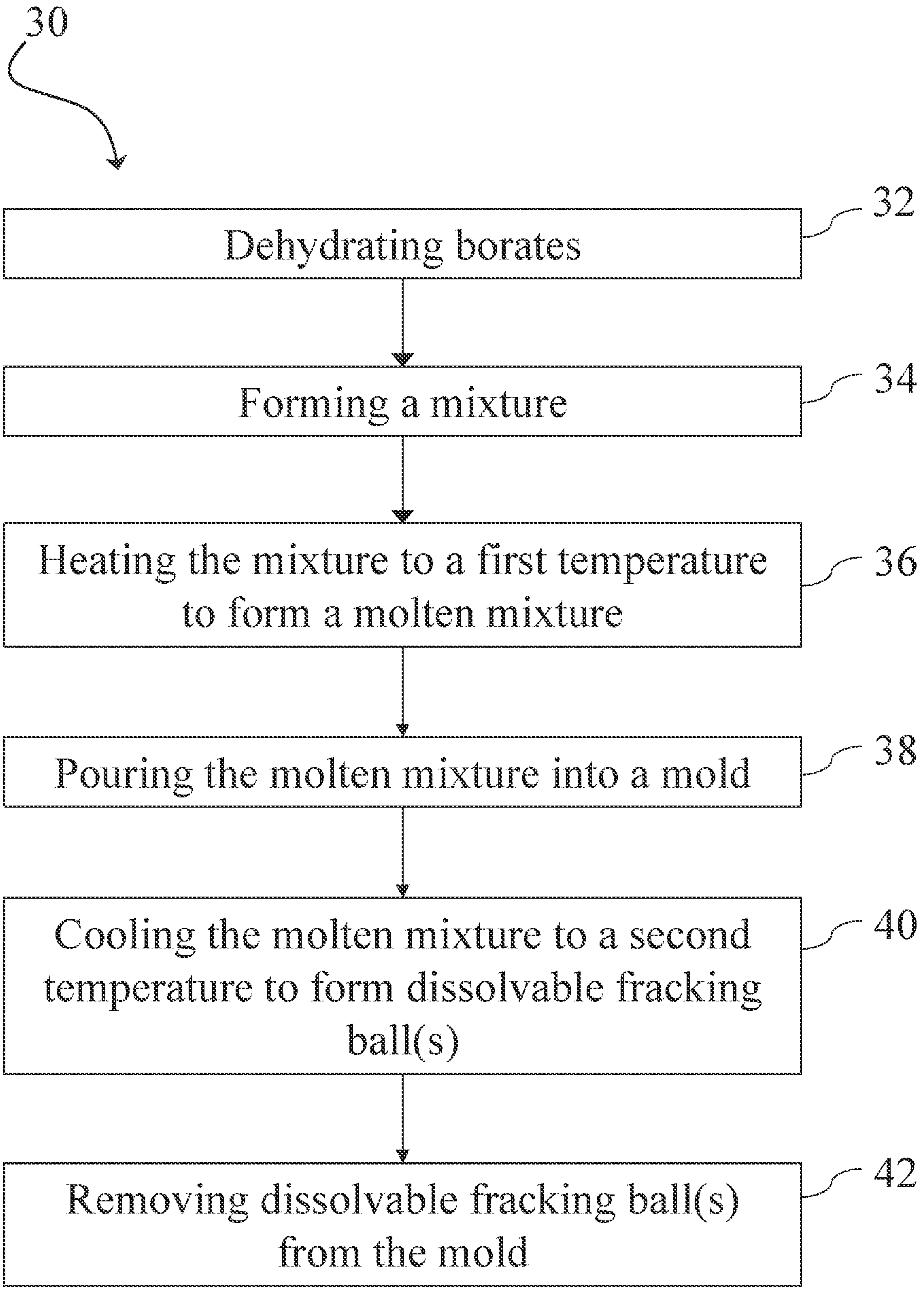
FIG. 4 illustrates an example of a method of forming a hydraulic fracking ball such as those of FIGS. 1-3.

FIG. 4 illustrates an exemplary method 30 of manufacturing dissolvable fracking balls 10, 12, 16, which can be manufacture from dehydrated borate, phosphates, and silicates. The method 30 includes the steps of dehydrating borates (step 32), forming a mixture (step 34), heating the mixture to a first temperature to form a molten mixture (step 36), pouring the molten mixture into a mold (step 38), cooling the molten mixture to a second temperature to form dissolvable fracking balls 10, 12, 16 (step 40), and removing the dissolvable fracking balls 10, 12, 16 from the mold (step 42).

As set forth above, the dissolvable fracking balls 10, 12, 16 can be manufactured from a mixture that includes dehydrated borate, phosphates, and silicates, additives (e.g., processing additives), fillers, nanotubes (e.g., nickel nanotubes, carbon nanotubes), or a combination thereof. The dehydration step (step 32) can be performed to remove approximately 40% to approximately 50% of the water content (e.g., bounded water) from borates. The removal of bounded water from borates can improve properties (e.g., mechanical properties) of the dissolvable fracking balls 10, 12, 16.

In step 34, dehydrated borate, phosphates, and silicates, additives (e.g., processing additives), fillers, nanotubes (e.g., nickel nanotubes, carbon nanotubes), or a combination thereof are mixed to form a mixture. In certain embodiments, the mixture can include more than approximately 50 weight percent (wt. %) of silicate and borates and/or dehydrated borate or boron, less than approximately 40 wt. % of additives, and up to approximately 18 wt. % of nanotubes and/or fillers.

In step 36, the mixture is heated to a temperature above the melting temperature of the mixture to form a molten mixture. For example, the mixture can be heated to a temperature between approximately 1000° C. and approximately 1300° C. The first temperature can be maintained for a sufficient period of time to completely or substantially melt the mixture.

In step 38, the molten mixture is poured into a mold (e.g., a mold engineered to form one or more dissolvable fracking balls 10, 12, 16 or other engineered parts, forms, shapes, tools, plugs, balls, and other items). In certain embodiments, the mold can be made of graphite, metal, ceramic. In certain embodiments, prior to pouring the molten mixture to the mold, the mold can be preheated to a temperature of approximately 900° C. to approximately 1100° C., allowing the thermal equilibrium of mold and molten feed material to set as a clear, dense solid ceramic net shape or part devoid of void space(s) and air bubbles.

In step 40, the molten mixture in the mold is cooled down to a second temperature to enable to the molten mixture to set up or solidify to form dissolvable fracking balls 10, 12, 16. The second temperature is lower than the first temperature. The molten mixture can be cooled actively (e.g., actively applying a suitable coolant, e.g., water, a flow of air, to the mold) or can be cooled naturally. The cooling sequence can be at a predetermined cooling and annealing schedule or exposes to rapid drops in temperature of hundreds of degrees and then held at the cooling temperatures and then allowed to cool to lower temperature for additional annealing time. According to another aspect, the molten anhydrous matrix compound can be cooled to below a strain point of the solid at a minimum cooling rate to form the water dissolvable ceramic part. The cooling schedule is repeated until the part is cooled to room temperature.

In step 42, once the molten mixture is completely solidified, the one or more dissolvable fracking balls 10, 12, 16 can be removed from the mold. Once cooled, the dissolvable fracking balls 10, 12, 16 can be machined, polished, and coated with a water-delay release coating.

Figure 5:
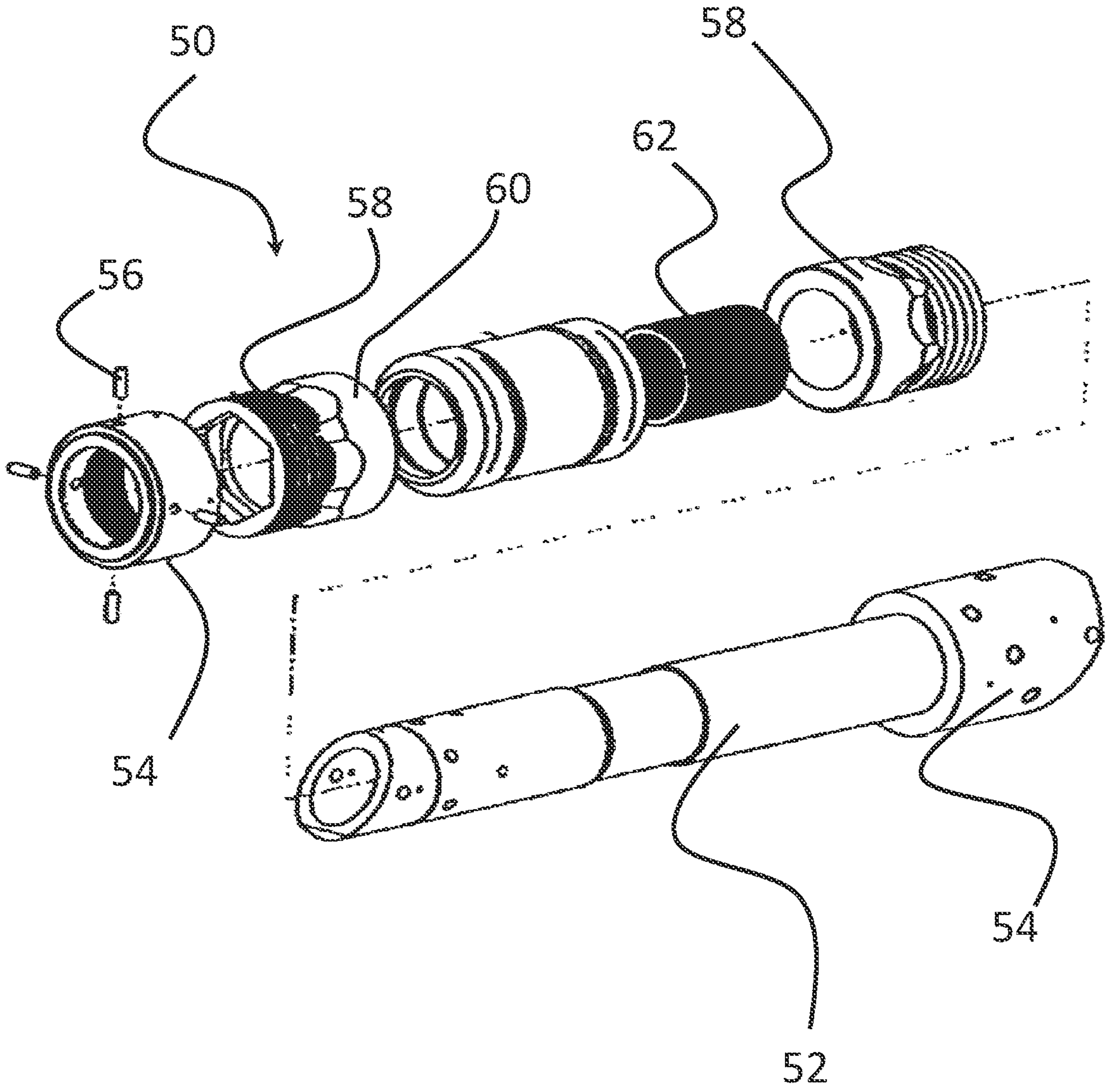
FIG. 5 schematically illustrates a hydraulic fracking plug.

While FIGS. 1-4 described hydraulic fracking balls 10, 12, 16, this description also applies to the manufacture of other fracking parts and components such as a fluid dissolvable hydraulic fracking plug 50 such as schematically illustrated in FIG. 5. As illustrated, a fracking plug 50 is made of a number of subcomponents, each of which can be manufactured from fluid soluble ceramic materials. The fracking plug 50 includes a flow through portion 52 that forms a passageway or channel for fluid to flow through the fracking plug 50. A fracking ball seat 54 to accommodate a fracking ball is secured to one end of the flow through portion 52. As illustrated, a number of subcomponents are mounted onto the flow through portion 52, including a threaded nut 54 with a series of pins 56 to lock down the fracking plug 50. There are a series of cleats 58 that can be activated (in some cases by a cleat activator 60) to impinge on the annual wall of the well casing to secure the fracking plug 50 in place. The fracking plug 50 can also include a rubber seal 62 that expands when the cleats are engaged to seal off any gaps between the fracking plug 50 and the well casing.

In certain other embodiments, hydraulic fracking tools are manufactured from a degradable elastomeric matrix material that is formed from a composite blend of fluid dissolvable ceramic fibers mixed and dispersed into an elastomeric compound. The elastomeric compound can be dispersible over time when exposed to fluids such as water, hydraulic fracking fluid, and brine. The dissolvable ceramic fibers have a generally temperature-dependent solubility in water, hydraulic fracking fluid, and brine. Such a combination of materials is particularly useful in the manufacture of degradable tooling for use in hydraulic fracturing among other applications.

Degradable fracking tools, such as fracking balls, fracking plugs, and other components helpful in fracking operations, can be manufactured from a fluid degradable two-phase or multi-phase composite in which at least one component (the elastomer phase) is an elastomeric matrix and at least one component (the soluble phase) is either a fluid soluble or otherwise readily degradable component in the form of flakes, platelets, granules, or powders. The fluid soluble component can be made from one of more of the following materials: (i) fluid soluble ceramic; (ii) fluid soluble polymer including but not limited to Polyvinyl Alcohol (PVA), Polylactic Alcohol (PLA), or Polyglycolide (PGA); or (iii) salts such as alkaline or alkaline earth metal halides, phosphates, sulfates, carbonates, etc.

The degradable fracking tools, including fracking balls, fracking plugs, and other components helpful in fracking operations, can be manufactured in such a way that the two phases result in a substantially interconnected network. The material or its constituents may or may not have a coating for the express purposes of reducing stress concentration upon impact and controlling the permeation of fluid (i.e., water, fracking fluid, brine, etc.) through its thickness so as to achieve rapid dissolving or degradation upon breaching this barrier. Thus, the embodiments relate to a fluid degradable elastomer composition having a controlled microstructure morphology in that the discrete fluid soluble components (ceramic fibers, flakes, granules, or coarse powders for example) are dispersed in the elastomeric component (a compounded rubber elastomeric matrix for example).

Disclosed herein are objects and tools that are a minimum of two phase composite made from an elastomeric matrix with dissolvable ceramic fibers and/or polymers dispersed in the elastomeric matrix and where the elastomeric matrix is dispersible into fine particles upon exposure to fluids such as water. Such dispersed fine particles of the elastomeric matrix can be readily flushed from a wellbore or other systems upon the tool degrading. The elastomeric material disclosed herein is readily formable into structural parts, seals, diverters, o-rings, chevron-seals, hydraulic fracking balls, re-fracking balls, and washers for sealing of oil and gas wellbores and other applications when designed for appropriate seal geometries and closures. Further, the composite materials presented herein can be formed into other types of structures via compression molding, injection molding, thermoforming, and extrusion processes for a variety of applications.

The elastomeric phase can be any one or more of the group consisting of but not limited to: silicone rubber, nitrile rubber, polyurethane, polybutadiene, styrene-butadiene, isoprene, butyl rubber, nitrile rubber, EPM, EPDM rubber, polyacrylic rubber and so on. This component is either insoluble or less soluble in fluids such as water as compared to the soluble phase. However, the elastomeric component does break down into fine particles and is dispersed in surrounding fluids upon exposure to those fluids. The main function of the elastomeric phase is to provide necessary strength to the degradable hydraulic fracking tool. The elastomeric phase also provides impact attenuation, binds the fluid soluble or substantially fluid soluble phase within the tool, and enhances deformability to form a seal in a well without loss of functionality.

It is also desirable to have the elastomeric phase efficiently degrade into sufficiently small fragments so as to be able to be removed (i.e., washed away) along with outflow of exiting fluids, such as backflushing fracking fluids from a stimulated well or other applications. Therefore, there is no need for removal of any part of the tool using a drill, reduction via injection of acids, or other typical means.

In one embodiment, the fluid soluble phase consists of one or more of the following compositions in one or more of the following forms: fibers, flakes, granular powders, agglomerate or deagglomerated particles, etc.: (i) crystalline or glassy ceramics such as borates, sulphates, phosphates, silicates, bicarbonates of alkaline, alkaline earth metals or transition metals; (ii) polymers such as fluid soluble or degradable polymers such as polyvinyl acetate, polyvinyl alcohol, polylactic acids, complex carbohydrates, etc.; and (iii) salts such as chlorides, bromides, iodides, fluorides, fluorophosphates of alkaline metals, nitrates, etc. Such fibers, flakes, granular powders, agglomerate or deagglomerated particles can be in one or more shapes such as spheres, rods, discs, or any other regular or irregular shapes.

The fluid soluble component can be coated with a thin layer of polymer to control its dissolution rate. The architecture of the material used to manufacture the tool, illustrated in FIGS. 6 and 7, can control the dissolution or degradation rate and be tailored to specific needs. This includes various applications within a well for fracking operations and well stimulation practices with minimal change in component composition but slight adjustment to thickness of the polymer coatings on individual soluble components as well as the overall component (for example, a fracking ball, a fracking seat holding the fracking ball, a fracking plug, etc. consisting of at least the two phases as described above).

Figure 6:
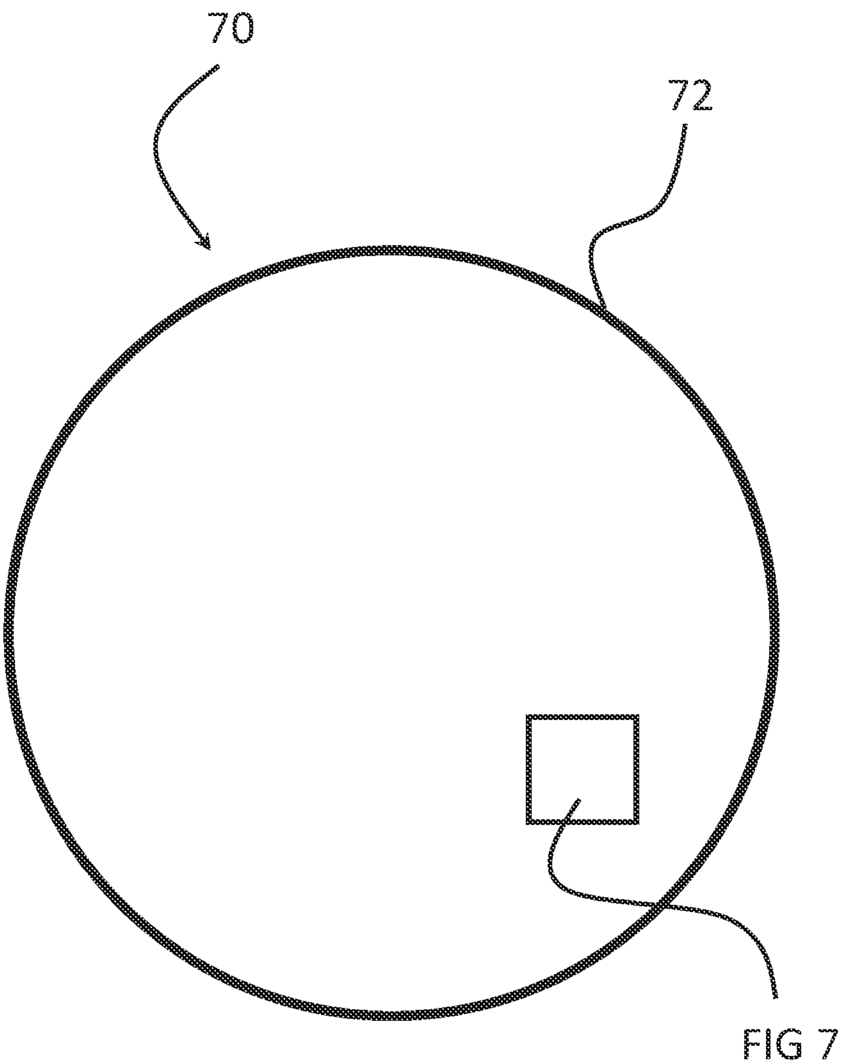
FIG. 6 schematically illustrates a hydraulic fracking tool.
Figure 7:
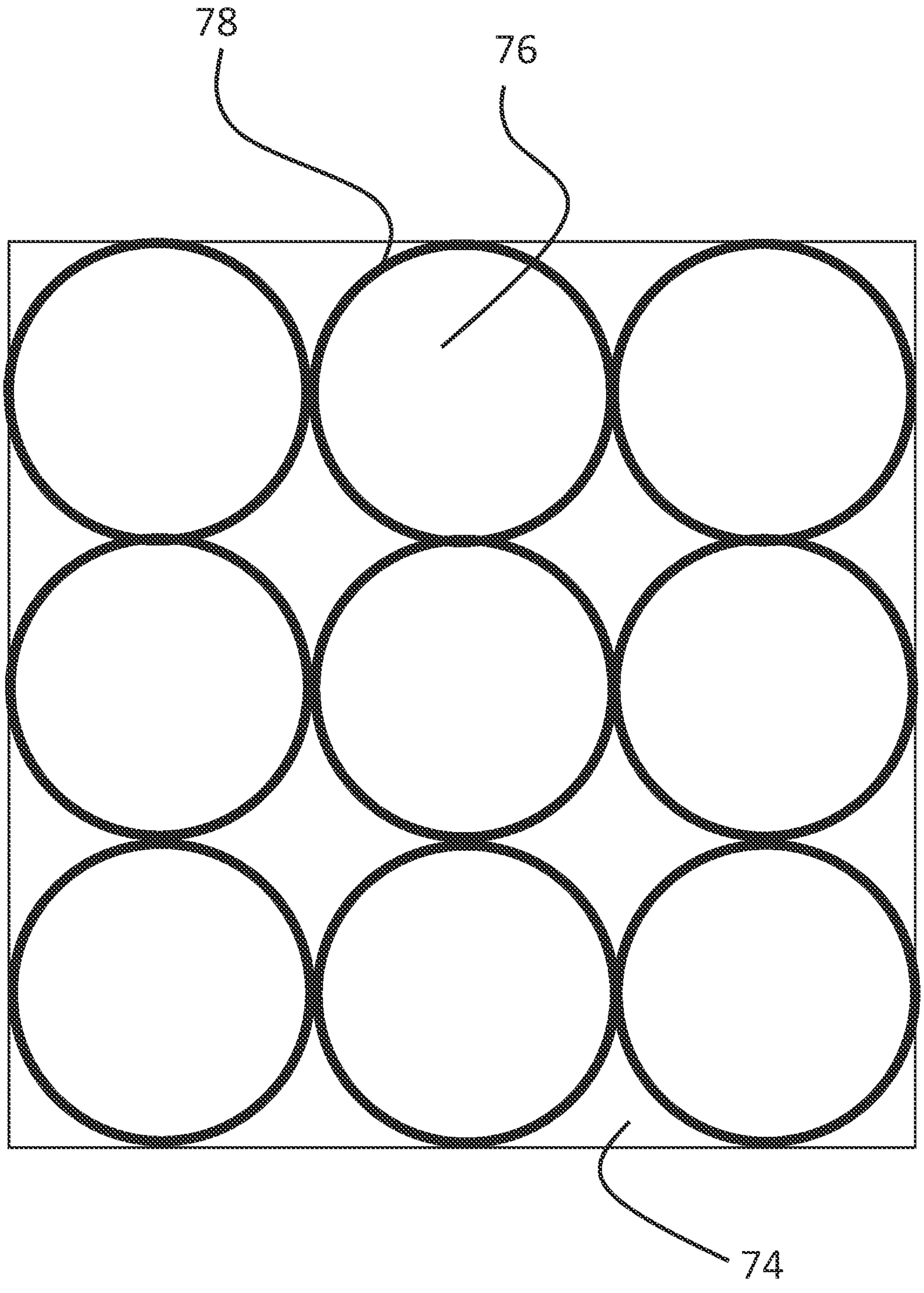
FIG. 7 schematically illustrates a detailed view of the structure of the hydraulic fracking tool of FIG. 6.

FIGS. 6 and 7 schematically illustrate a fluid degradable fracking ball 70 and its internal structure. The fracking ball 70 includes a two phase architecture as described above—a fluid soluble component with a fluid permeable coating and an elastomer component that serves as a matrix to capture the fluid soluble components. The fracking ball 70 itself includes a fluid permeable coating 72 along its outside surface. As illustrated in the detailed view of FIG. 7, the structure of the fracking ball 70 includes an elastomeric matrix 74 with spherical particles 76 dispersed throughout the matrix 74. The elastomer 74 is arranged to fragment into small flushable pieces over time once exposed to a fluid such as water. The spherical particles 76 are fluid (such as water) soluble and degradable upon exposure to the fluid. The spherical particles 76 include a fluid permeable polymer coating 78. While the particles 76 are described and illustrated as spherical, it will be understood that the particles can be other shapes or random irregular shapes as well.

As will be understood, once the fracking ball 70 is positioned in a well to seal the well, the structural integrity of the fracking ball 70 will remain intact until the fracking ball 70 is exposed to a fluid such as water, fracking fluid, brine, etc. Once the fracking ball 70 is exposed to a fluid, the fluid will pass through the permeable coating 72 of the fracking ball 70 at a rate determined by the composition and thickness of the permeable coating 72. Once the fluid permeates into the fracking ball 70, the elastomeric matrix 74 begins to degrade upon contact with the fluid. The fluid also engages with the permeable polymer coating 78 of the spherical particles 76. Similarly, once the pherical particles 76 are exposed to a fluid, the fluid will pass through the permeable polymer coating 78 of the spherical particles 76 at a rate determined by the composition and thickness of the permeable polymer coating 78. Once the fluid permeates into the spherical particle 76, the material inside the spherical particle 76 begins to dissolve upon contact with the fluid. Ultimately, the fracking ball 70 degrades and the well is no longer sealed.

In another example, a hydraulic fracking plug is made to provide a seat for a fracking ball, where the hydraulic fracking plug is also fluid degradable and thus degrades when exposed to a fluid such as water, fracking fluid, brine, etc. In one embodiment, the fracking plug is manufactured from the following materials (with relative weights provided in Table 1):

(1) an elastomer base—Hydroxy terminated polybutadiene (HTPB);
(2) a plasticizer—DOA (Di-Octyl Adipate);
(3) a curing agent—TriPhenyl Bismuth;
(4) a hardener—IPDI (Isophorone Diisocyanate);
(5) a fluid soluble component comprised of:
   (a) sodium borate glass or its equivalent with $B_2O_3$ content <80 mole %; and
   (b) balance $Na_2O$ derived from $Na_2B_4O_7$, $H_3BO_3$ and $NaBO_4$ in desired ratios, e.g., 50%, 25%, 25% by weight reactants fused together to form glass and cast in the form of the component or powder or flakes or fibers, and in this example, −40+200 mesh powder; and
(6) a coating—acrylic coating (Paraloid acrylic polymer dissolved in acetone to form spray solution).

TABLE 1

| Component | Mix Composition | Relative Weights |
|---|---|---|
| 1 | HTPB | 7.346 |
| 2 | DOA | 7.346 |
| 3 | Catalyst - TPB | 0.02 |
| 4 | IPDI | 0.95 |
| 5 | Water Soluble Ceramic | 42 |

An exemplary process for mixing the components listed above is as follows. Components 1-3 are mixed in a conventional mixer at about 30-35° C. after which component 5 is added followed by component 4 to form a compressible dough that could be molded into a shape at low pressure typically below 200 psi. The mold and compressible dough mixture are allowed to cure at temperature between 50-70° C. until desired hardness and curing level (>80%) are attained. The mixture is then removed from the mold and coated with component 6—the acrylic coating, Paraloid acrylic polymer is soluble in solvents like acetone or MEK. The thickness of this coating can range from 0.1 mm to 2.0 mm depending upon the desired dissolution rate of a hydraulic fracking plug in a given fracking fluid and at the well temperature.

In another embodiment, the process as described above is modified in that the acrylic coating is replaced by the elastomer produced from components 1-3 and 5. In a further embodiment, the elastomer coating contains a water soluble ceramic (such as −200+360 mesh glass powder) so that the volume fraction of powder is between 5-30 vol %.

One skilled in the art will appreciate that, for this and other processes and methods disclosed herein, the functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

We claim:

1. A fluid soluble hydraulic fracking tool, comprising:
a hydraulic fracking object comprising a multi-phase composite comprising a fluid soluble phase dispersed in an elastomeric matrix; and
a hydraulic fracking plug comprising subcomponents each made of a multi-phase composite comprising:
   an elastomer base comprising hydroxy terminated polybutadiene (HTPB);
   a plasticizer comprising di-octyl adipate (DOA);
   a curing agent comprising triphenyl bismuth (TPB);
   a hardener comprising isophorone diisocyanate (IPDI); and
   a fluid soluble component comprising water soluble ceramic, wherein the subcomponents comprise a seat configured to secure the hydraulic fracking object, and wherein both the hydraulic fracking object and the hydraulic fracking plug are dissolvable in a fluid comprising water, hydraulic fracking fluid, brine, or a combination thereof.

2. The fluid soluble hydraulic fracking tool of claim 1, wherein the multi-phase composite of the hydraulic fracking object is manufactured from a mixture comprising dehydrated borates comprising 50% to 60% bounded water.

3. The fluid soluble hydraulic fracking tool of claim 1, wherein the fluid soluble phase is in a form of fibers, flakes, granular powders, agglomerate or deagglomerated particles, or a combination thereof.

4. The fluid soluble hydraulic fracking tool of claim 1, wherein the fluid soluble phase comprises at least one of fluid soluble ceramic, fluid soluble polymer, and salts.

5. The fluid soluble hydraulic fracking tool of claim 4, wherein the fluid soluble ceramic comprises borates, sulphates, phosphates, silicates, bicarbonates of alkaline, alkaline earth metals or transition metals, or a combination thereof.

6. The fluid soluble hydraulic fracking tool of claim 4, wherein the fluid soluble polymer comprises polyvinyl alcohol (PVA), polylactic alcohol (PLA), polyglycolide (PGA), polyvinyl acetate, polylactic acids, complex carbohydrates, or a combination thereof.

7. The fluid soluble hydraulic fracking tool of claim 4, wherein the salts comprise alkaline or alkaline earth metal halides, phosphates, sulfates, carbonates, chlorides, bromides, iodides, fluorides, fluorophosphates of alkaline metals, nitrates, or a combination thereof.

8. The fluid soluble hydraulic fracking tool of claim 1, wherein the elastomeric matrix comprises at least one of silicone rubber, nitrile rubber, polyurethane, polybutadiene, styrene-butadiene, isoprene, butyl rubber, nitrile rubber, EPM, EPDM rubber, and polyacrylic rubber.

9. The fluid soluble hydraulic fracking tool of claim 1, therein the hydraulic fracking object is a hollow object with a hollow core.

10. The fluid soluble hydraulic fracking tool of claim 9, wherein the hydraulic fracking object comprises well chemicals positioned in the hollow core.

11. The fluid soluble hydraulic fracking tool of claim 1, wherein the hydraulic fracking object comprises an outer coating configured to provide additional control of a predetermined dissolving time of the hydraulic fracking object.

12. The fluid soluble hydraulic fracking tool of claim 11, wherein the outer coating is fluid permeable, non-fluid permeable, or a combination thereof.

13. The fluid soluble hydraulic fracking tool of claim 1, wherein the fluid soluble phase comprises particles coated with a fluid permeable polymer coating.

14. The fluid soluble hydraulic fracking tool of claim 1, wherein the subcomponents of the hydraulic fracking plug further comprise:

a flow through portion that forms a passageway for the fluid to flow through the hydraulic fracking plug;

a threaded nut and pins that are mounted onto the flow through portion and lock the hydraulic fracking plug;

cleats that are configured to impinge on an annual wall of a well casing to secure the hydraulic fracking plug in place; and a rubber seal that is configured to expand when the cleats are engaged to seal off any gaps between the hydraulic fracking plug and the well casing.

15. The fluid soluble hydraulic fracking tool of claim 1, wherein hydraulic fracking plug is manufactured by steps comprising:

mixing the elastomer base, the plasticizer, and the curing agent to form a first mixture;

adding the fluid soluble component and subsequently adding the hardener to the first mixture to form a second mixture; and molding and curing the second mixture into components for forming the subcomponents of the hydraulic fracking plug.

16. The fluid soluble hydraulic fracking tool of claim 15, wherein the steps further comprise coating the components with the acrylic or elastomeric coating.

* * * * *